Oct. 12, 1926.
G. SAUER
AUTOMOBILE BUMPER
Filed Oct. 3, 1924　　2 Sheets-Sheet 1
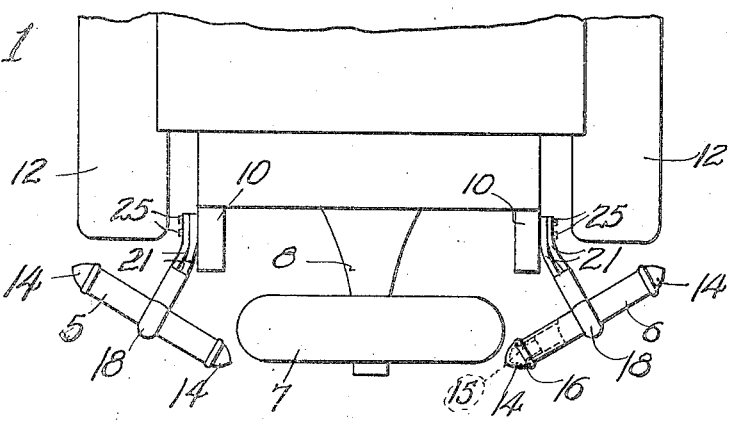
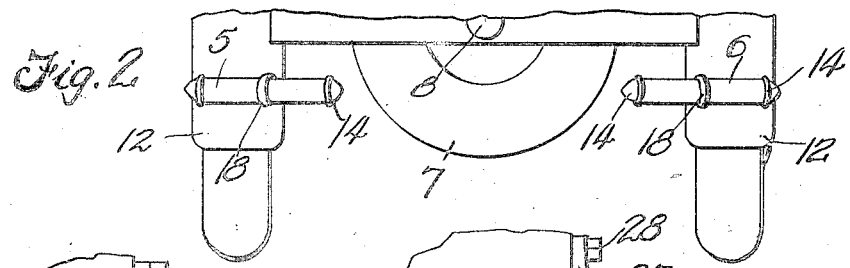
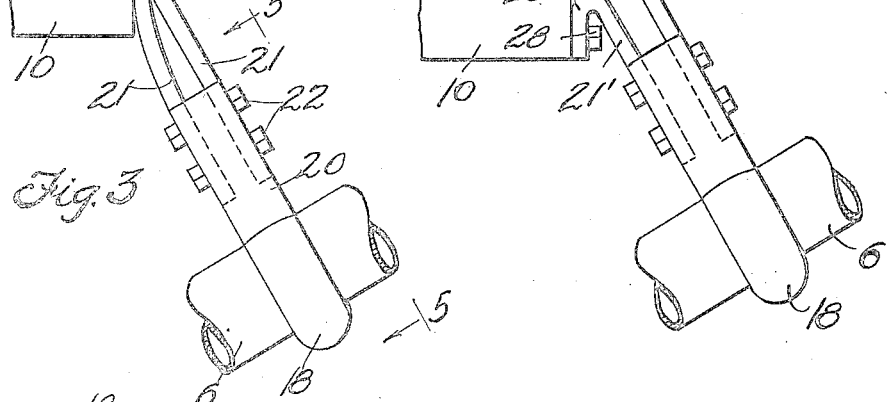
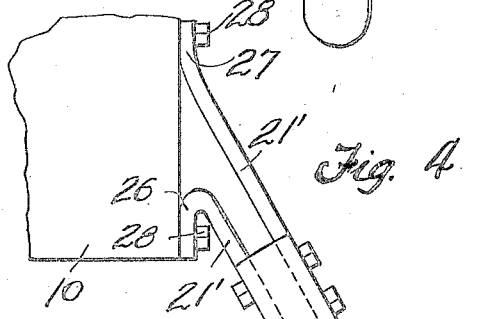
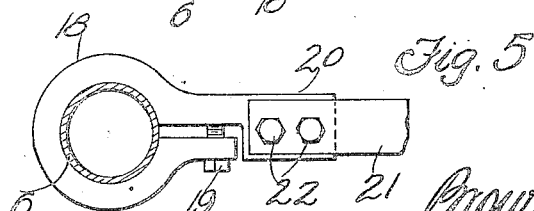
Inventor
George Sauer
By Brown Boettcher Dienner
Attys.

Oct. 12, 1926.

G. SAUER

AUTOMOBILE BUMPER

Filed Oct. 3, 1924    2 Sheets-Sheet 2

1,602,414

Inventor
George Sauer
By Brown, Boettcher & Dienner
Att'ys.

Patented Oct. 12, 1926.

1,602,414

UNITED STATES PATENT OFFICE.

GEORGE SAUER, OF CHICAGO, ILLINOIS, ASSIGNOR, BY MESNE ASSIGNMENTS, TO AUTOMOBILE EQUIPMENT MANUFACTURING CORPORATION, OF CHICAGO, ILLINOIS, A CORPORATION OF ILLINOIS.

AUTOMOBILE BUMPER.

Application filed October 3, 1924. Serial No. 741,300.

This invention relates to automobile bumpers and its objects are to provide an improved device and arrangement in furtherance of maximum protection with minimum means and adaptability to different over-all automobile widths and different lateral fender extensions.

The invention is illustrated in the accompanying drawings, in which:

Figure 1 is a fragmentary top plan view of an automobile, showing my improved bumper means applied thereto;

Fig. 2 is a fragmentary rear elevational view of the same;

Fig. 3 is a plan view of one form of mounting bracket which may be employed;

Fig. 4 is a similar view of another form of mounting bracket;

Fig. 5 is a cross sectional view through the bumper member on line 5—5 of Fig. 3, showing the mounting parts of said figure in side elevation;

Figure 6:
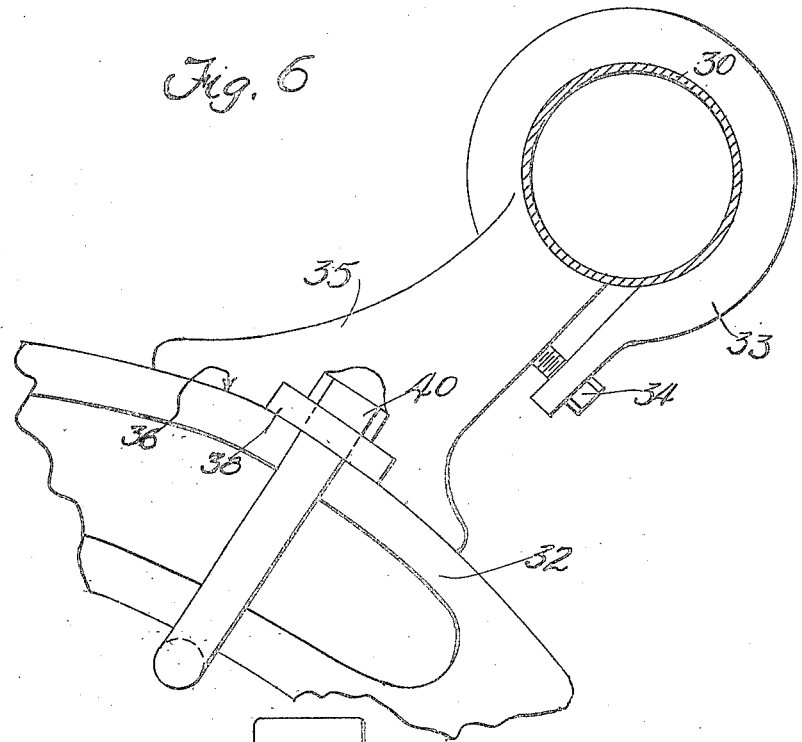
Fig. 6 is a side elevational view of an improved bracket that may be employed for mounting the front cross bumper.

The bumper means of my present invention supplements the usual spare tire in affording complete protection, and it comprises a pair of relatively short bumper members 5 and 6 mounted, as will be described, diagonally or obliquely at opposite sides of the vehicle. The combined length of these bumper members may usually be appreciably less than the over-all width dimension of the automobile and at the same time maximum protection is afforded, not only the end of the automobile, but the corners and adjacent side portions thereof. The arrangement of the bumper members affords maximum protection and by making said members of uniform cross section, the mounting bracket may be adjusted along the lengths of said members to adapt them to different over-all widths of the automobile and to different lateral extensions or projections of the fenders from the main side frame members or other parts upon which the bumper members are mounted.

The spare tire of the automobile is usually supported laterally across the rear of the automobile. In the drawings, I have illustrated such a tire 7, as being so supported at 8. The main side frame members of the automobile, which are usually of channel formation and open inwardly, are shown at 10, 10 and the rear fenders or mud-guards at 12, 12.

Each bumper 5 and 6 comprises a relatively short main bumper member, which is of uniform cross section, preferably in the form of a cylindrical bar or tube. These main bumper members may have end caps 14, 14 at their opposite ends, which end caps may be of sheet metal, such as sheet steel or brass, formed with cylindrical portions 15 for driving fit in the ends of members 5 and 6 and with annular lips 16 within which the end of the main bumper member may extend with a driving fit as shown in dotted lines in Fig. 1, and as more fully disclosed in my co-pending application, Serial No. 732,373, filed August 16, 1924. Alternatively, the head members may be cast simply with cylindrical portions for driving fit in members 5 and 6 or they may be otherwise formed.

A clamping member 18 is provided for each bumper member 5 and 6. Each of these clamping members is in the form of a single split ring which is adapted to encircle the main bumper member and be clamped tightly thereon, between its ends by a cap bolt 19 engaging in an extension on the end of the split ring.

One end of each split ring has a further extension 20 to the opposite sides, respectively, of which mounting arms 21, 21 are secured by means of bolts 22, 22. The opposite sides of extension 20 may be mortised or grooved for the reception of these arms. The free ends of the mounting arms 21, 21 are in the embodiment shown in Figs. 1 and 3, brought together and turned obliquely at 24 to lie one on the other parallel to the rear ends of the main frame members 10, 10 of the automobile, to which they are secured by means of bolts 25, 25, each of which bolts extends through both arms 21, 21 and is secured in the adjacent frame member 10.

In the embodiment shown in Fig. 4, the frame ends of the mounting arms 21′, 21′ are turned obliquely in opposite directions at 26 and 27 and are independently secured to the rear end of the adjacent frame member 10′ of the automobile by bolts 28, 28.

By these mountings, convenient attachment may be made to various types and forms of automobile frames, and the main bumper member being of uniform cross section, the single clamping member may be positioned as desired lengthwise of the main member to secure the desired lateral or rearward projection of the ends of the bumper members. The amount of lateral extension of the fenders, for example, of different automobiles, from the frame varies and the clamping members 18 may be positioned laterally the proper distance to provide complete protection. By adjustment of the position of the clamping members along the uniform cross sectional bodies of the main bumper members, the over-all width of the bumper protection may be varied or the lateral projection from the main frame member outwardly, may be varied, as desired, to suit different types and makes of automobiles. The main bumper members 5 and 6 may be of steel tubing suitably finished to give a pleasing appearance.

When the mounting arms are secured in place, the bumper members are, by the oblique turning of the frame ends of the mounting arms 21, 21 or 21', 21', disposed diagonally or obliquely across opposite sides of the rear corners of the automobile. The tire 7 is disposed between the rear converging ends of the bumper members and said members diverge forwardly and to opposite sides of the automobile and with the tire 7 afford, not only complete protection for the rear of the automobile with a minimum means, but afford maximum protection for the corners and adjacent sides of the reverse. I find that in actual practice about one-half inch projection laterally beyond the fenders is sufficient to afford maximum protection without materially increasing the over-all width of the vehicle and, as already pointed out, the same lateral projection may be provided regardless of the lateral distance between the frame or other part of mounting and the sides of the fenders or different lateral projections may be provided, as desired.

The diagonal disposition of the bumper members disposes their outer ends adjacent the fenders and prevents that damage to the fenders which has heretofore resulted from blows received at an angle, as when one vehicle turns into the line of travel of another vehicle from a side street, for example, and encounters the rear of the first vehicle between the rear of the rear fender and the adjacent end of the rear bumper. The protection afforded is, thereby, improved. The rigidity of the bumper member, itself, and of the mounting provided therefor, prevents springing of the bumper under the impact of a blow into engagement with the fender, for example, and this with the diagonal disposition of the bumper member deflects blows from the rear out at an angle to the side and those from the side off at an angle to the rear.

Figure 7:
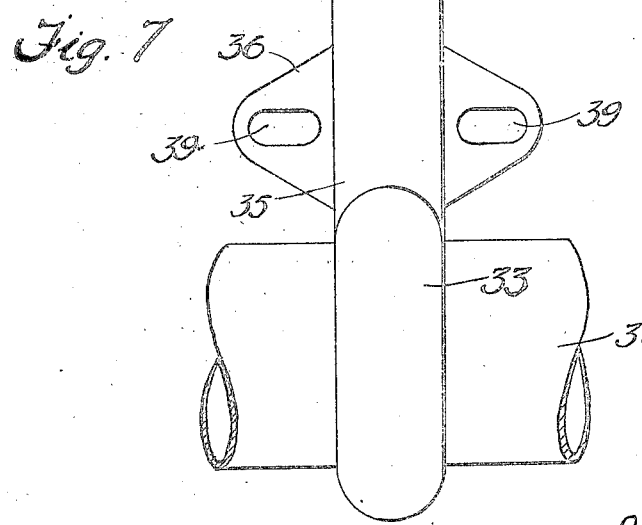
Fig. 7 is a top plan view of the same.

In Figs. 6 and 7, 30 designates the main bumping member which may be mounted, as will be described, across the front of the automobile and which is approximately equal in length to the over-all width dimension thereof. This main member 30 is supported rigidly upon the front ends of the frame members 32 of the automobile, the portions of the frame to which it is attached being the usual curved forwardly extending portions of channel formation, one on each side, to which the ends of the front springs are usually connected. A clamping member 33, in the form of a single split ring, is adapted to encircle the member 30 and is tightly clamped thereon by means of a cap bolt 34 engaging the extensions on the ends of the ring member. One end of the split ring has a further extension 35 which forms a mounting pedestal and which may have its base 36 formed to conform with the part upon which it is mounted, as with the upper surface of the forward curved end of the frame member 32. The base 36 has lateral lugs 38 provided with apertures 39 and a U bolt, for example, may embrace the adjacent end of the frame member 32 or be inserted through suitable apertures with its free ends extending through apertures 39 and engaging suitable nuts 40 which clamp the bracket rigidly in place. The apertures 39 are preferably elongated to accommodate the different dimensions of the different automobiles or different mountings on the same automobile. The U formation of the mounting bolt may, of course, be varied, as may the particular parts to which the bracket is attached and the particular point of mounting thereof.

I claim:

1. In combination, an automobile frame, a tire supported laterally thereacross, separate bumper members supported, one at each of the opposite sides of said tire, said bumper members being of uniform cross section, and means for attaching said members to the frame, said attaching means including a clamp surrounding each of said bumper members between its ends and clamped thereto.

2. In combination, an automobile frame, a pair of relatively short separate bumper members of uniform cross section, a clamp surrounding each of said members between its ends and clamped thereto, and means for attaching said clamps to the automobile frame with said bumper members disposed diagonally at opposite sides of the end of the vehicle.

3. The combination with an automobile having a transversely supported spare tire and a pair of side fenders, of a pair of rigid separate bumper members mounted diagonally at opposite sides of said tire with the tire between their inner converging ends and their outer ends diverging forwardly towards opposite sides of the vehicle to lie adjacent said fenders.

4. The combination with an automobile having a transversely supported spare tire and a pair of side fenders, of a pair of separate rigid bumper members supported at opposite sides of said tire and lying diagonally across the spaces between the tire and the fenders.

5. An automobile bumper comprising a relatively short main bumper member, a mounting arm extending therefrom, said arm having a ring portion surrounding the bumper member and clamped thereon and an obliquely turned portion and means for fastening said obliquely turned portion to an automobile frame to support said main bumper member obliquely at one side thereof.

6. An automobile bumper comprising a relatively short main bumper member of uniform cross section, a clamp surrounding said member and clamped thereon, a pair of mounting arms attached to said clamp and having obliquely turned portions, and means for attaching the obliquely turned portions of said arms to an automobile frame.

In witness whereof, I hereunto subscribe my name this 24th day of September, 1924.

GEORGE SAUER.